United States Patent [19]

Fox

[11] Patent Number: 4,788,514

[45] Date of Patent: Nov. 29, 1988

[54] OPTICAL MODULATION ARRANGEMENT

[75] Inventor: Alan J. Fox, Crawley, England

[73] Assignee: U.S. Philips Corp., New York, N.Y.

[21] Appl. No.: 907,713

[22] Filed: Sep. 15, 1986

[30] Foreign Application Priority Data

Sep. 30, 1985 [GB] United Kingdom ............... 8524082

[51] Int. Cl.$^4$ .................... B41C 1/10; H01S 3/10
[52] U.S. Cl. .................... 332/7.51; 101/467
[58] Field of Search .................... 332/7.51; 330/4.3; 372/55; 101/467, 471

[56] References Cited

U.S. PATENT DOCUMENTS

| | | | |
|---|---|---|---|
| 3,431,504 | 3/1969 | Adler | 332/7.51 X |
| 3,586,994 | 6/1971 | Rosenberger | 372/55 |
| 3,806,834 | 4/1974 | Johnston et al. | 372/55 X |
| 3,985,953 | 10/1976 | Dunkley | 101/467 X |
| 3,992,682 | 11/1976 | White et al. | 332/7.51 |
| 4,015,221 | 3/1977 | Dalton | 332/7.51 |
| 4,020,762 | 5/1977 | Peterson | 101/471 X |
| 4,054,094 | 10/1977 | Caddell et al. | 101/467 |
| 4,064,205 | 12/1977 | Landsman | 101/467 X |
| 4,112,390 | 9/1978 | Farcy | 330/4.3 X |
| 4,126,834 | 11/1978 | Coppock | 332/7.51 |
| 4,164,717 | 8/1979 | Blazcy | 332/7.51 |
| 4,168,474 | 9/1979 | Pleasance | 372/55 X |
| 4,238,741 | 12/1980 | Kasner et al. | 372/55 X |
| 4,264,868 | 4/1981 | Leland et al. | 372/55 |
| 4,468,776 | 8/1984 | McLellan | 372/55 X |
| 4,638,266 | 1/1987 | Auch et al. | 332/7.51 |

FOREIGN PATENT DOCUMENTS 2090047 6/1982 United Kingdom ............... 372/55
2175234 of 1986 United Kingdom .

OTHER PUBLICATIONS

"Acousto-Optic Modulators for $CO_2$ Lasers at 10.6 $\mu$m Wavelength", IEEE Colloquim on Acoustooptic Techniques, Digest No. 78, London, England, Nov. 1, 1983.
Abrams, R. L. et al., "Characteristics of Sealed-Off Waveguide $CO_2$ Lasers," IEEE Journal of Quantum Electronics, vol. QE-9, No. 9, pp. 940-946 (Sep. 1973).
Eleccion, M., "Materials Processing with Lasers," IEEE Spectrum, vol. 9, pp. 62-72 (Apr. 1972).
Gordon, E. I., "A Review of Acoustooptical Deflection and Modulation Devices," Proc. IEEE, vol. 54, No. 10, pp. 1391-1401 (Oct. 1966).
Klein, M. B. et al., "10.6 $\mu$m Waveguide Laser Power Amplifier," IEEE Journal of Quantum Electronics, vol. QE-11, No. 8, pp. 609-615 (Aug. 1975).
Nussmeier, T. A. et al., "Stark Cell Stabilization of $CO_2$ Laser," Applied Physics Letters, vol. 25, No. 10, pp. 615-617 (Nov. 15, 1974).
Smith, P. W., "Mode Selection in Lasers," Proc. IEEE, vol. 60, No. 4, pp. 422-440 (Apr. 1972).
Figueira et al., "Carbon Dioxide Laser System with Zero Small Signal Gain", Applied Optics, vol. 19, No. 3, 1980.
Shoemaker et al., "Frequency-Switchable $CO_2$ Laser: Design and Performance", Applied Optics, vol. 21, No. 5, 1982.
McKnight, "Exitation Mechanisms in Pulsed $CO_2$ Lasers", Journal of Applied Physics, vol. 40, No. 7, 1969.

Primary Examiner—Thomas H. Tarcza
Assistant Examiner—Mark Hellner
Attorney, Agent, or Firm—William L. Botjer

[57] ABSTRACT

In a laser beam modulation system, e.g. for pattern machining, in which a laser beam is modulated prior to power amplification, an acousto-optic modulator can provide a low beam extinction level when the diffracted beam is used, but the modulator causes an optical frequency change (Dopplar effect) taking the modulated beam outside the laser amplifier passband when both the source and amplifier are low pressure (1 torr) $CO_2$ lasers.

This is overcome by operating at least one of the lasers at an elevated gas pressure thus increasing the lasing amplification bandwidth. Thus a waveguide $CO_2$ laser can be used as the amplifier but the power available is limited. Preferably a tunable waveguide $CO_2$ laser source is used tuned to a frequency offset sufficient to accommodate the modulation beam and sidebands within the passband of a conventional low pressure high power $CO_2$ amplifier laser.

12 Claims, 4 Drawing Sheets

OPTICAL MODULATION ARRANGEMENT

BACKGROUND OF THE INVENTION

The invention relates to an optical modulation arrangement for modulating a beam of optical radiation generated by a laser source. The arrangement includes an optical modulator for modulating the amplitude of the beam by means of an electrical signal, followed by a laser amplifier for amplifying the modulated beam.

Laser beams having a high energy density capable of melting or vaporizing substances, are often employed in industry for performing machining operations on workpieces, such as for example milling, cutting, or drilling. Consequently, many forms of high power lasers have been developed for this purpose many of which have to be employed in pulsed operation using for example Q-switching. These types of lasers require a considerable time interval between pulses in order to repopulate the lasing energy level and to keep the average dissipation down to a level below that at which damage to the material of the laser occurs. In some cases this interval is as great as 2 seconds.

These remarks mainly apply to solid state lasers. In the case of gas lasers, the highest power has been obtained from the $CO_2$ laser which is capable of continuous operation at 10 KW. Certain industrial operations, however, require a highly accurate and continuous control of the energy of the work beam at high modulation frequencies, for example when a fine and intricate image pattern has to be produced directly on a metal die or plate for embossing or printing.

IEEE Spectrum, Vol. 9 (April 1972), pages 62–72, mentions a modulated laser beam system developed at the Bell Telephone Laboratories, for generating a primary pattern for an IC mask on a photographic plate. The system uses a low powered argon laser followed by an acousto-optic modulator and a mechanical scanning arrangement for which beam modulation frequencies in excess of 1 MHz were employed. Since this was a photographic process only low power was required. However, when it is desired to apply a pattern directly to metal or other substance by thermal attrition, the problem arises that suitable optical modulators have very restricted power handling capabilities and it becomes necessary to employ a low-power source-laser to feed the optical modulator, and then to amplify the modulated radiation beam by means of a laser amplifier to provide the desired power level for the work beam.

The main forms of optical modulator are electro-optic, magneto-optic and acousto-optic. Electro-optic modulators are electrically difficult to drive and to match because of the high drive voltage and large associated capacity, and are difficult to manufacture with a sufficiently good optical quality. However, their main disadvantage for the applications mentioned is that it can be difficult to provide a satisfactorily low beam extinction level. This latter difficulty can also occur with magneto-optic modulators. By contrast, the acousto-optic modulator, in which the laser beam is refractively Bragg diffracted by an amplitude modulated acoustic beam propagating in an acoustic medium, can reliably provide complete extinction of the modulated output beam provided that the latter is formed by the diffracted beam.

However, since the diffracted beam is generated by a refraction structure corresponding to the local stress pattern caused in the acoustic medium by the propagating acoustic waves, this structure will also propagate with the velocity of the acoustic wave and will cause the optical frequency of the diffracted modulated beam to change by an amount equal to the frequency of the acoustic wave which may be, typically, 60 to 100 MHz.

The type of laser that would normally be employed as a laser amplifier for a potentialy continuous high output power would be a form of low pressure $CO_2$ laser, working for example at a $CO_2$ gas pressure of about 1 torr, preferably with continuous renewal of $CO_2$, and in the amplified beam arrangement the source laser would also be a low pressure $CO_2$ laser. However, if an acousto-optic modulator were employed as the optical modulator, the consequent frequency conversion of the diffracted modulated beam discussed above, would shift the frequency of the modulated beam outside the narrow amplification bandwidth of the subsequent $CO_2$ laser amplifier.

SUMMARY OF THE INVENTION

It is an object of the invention to provide an improved optical modulation arangement in which this difficulty can be reduced or overcome.

According to the invention there is provided an optical modulation arrangement of the kind specified characterised in that the optical modulator is an acousto-optic modulator employing refractive Bragg diffraction from an acoustic wave propagating in an acoustic medium transparent to the optical radiation. The laser source and the laser amplifier are both gas lasers employing the same kind of lasing gas, and at least one of the lasers operates at an elevated gas pressure such as to provide an increased amplification bandwidth which is sufficient to span the change in the optical frequency imposed on the diffracted modulated output beam by the acousto-optic modulator.

The gas lasers can be $CO_2$ lasers and, preferably, the amplifier laser can be provided with an arrangement for circulating the laser gs during operation.

In one form of optical modulation arrangement in accordance with the invention the laser amplifier comprises at least one gas laser operated at an elevated gas pressure such that the useful amplificaion bandwidth includes the converted optical frequency and its modulation sidebands.

It should be understood that when the operating pressure of a gas laser is to be changed, various scaling factors have to be applied in order to maintain similar conditions for the electrical discharge and for the lasing process. For example, an increase in the gas pressure requires, inter alia, that the bore diameter of the discharge tube should be correspondingly reduced. Thus if the pressure in a $CO_2$ laser is increased to about 150–200 torr then the bore diameter should be reduced to about 1.5 mm. This size of bore together with the choice of a suitable wall material, for example BeO, $Al_2O_3$ or $SiO_2$, enable the discharge tube to act as an overmoded optical waveguide with some benefit to the optical efficiency and mode stability of the laser. Such a laser is commonly known as a waveguide laser. Commercial waveguide lasers which employ a single section of capillary discharge tube, however, are generally limited because of their size to a maximum output of about 40 watts as a laser source, and would only achieve an output of about 5 watts maximum as an amplifier.

Thus an optical modulation arrangement in accordance with the invention can employ a single section waveguide laser as the laser amplifier, or could employ a tandem arrangement of waveguide laser sections in order to provide a larger output.

Even this may not provide sufficient power output for some applications such as the manufacture of metal printing blocks, and in a preferred form of an optical modulation arrangement in accordance with the invention, the source laser is arranged to operate at an elevated gas pressure and is tuned by means of an optical cavity so that the optical frequency of the generated beam is offset from the amplification frequency range of the laser amplifier by at least part of the change in the optical frequency imposed on the diffracted modulated output beam by the acousto-optic modulator.

Thus the source laser can be a tunable $CO_2$ waveguide laser and can be off-tuned from the natural P2O lasing transition at 10.6 μm in order to offset at least a part of the frequency change caused by the acousto-optic modulator.

If the tuning offset is made at least nearly equal to the frequency of the acoustic wave in the acousto-optic modulator, the amplifier laser can be a conventional low pressure $CO_2$ laser and such lasers are readily available, commercially, with a power output capability of up to about 100 watts. Since the amplification bandwidth of such a laser is about 70 MHz, the offset can be slightly different from the acoustic frequency provided that the modulated beam frequency and sidebands lie within the ±35 MHz amplifier passband. This may be desirable because it is not always possible to lock a tunable waveguide laser to a specified frequency in a stable and repeatable manner because of a tendency sometimes to jump from one to another of the closely spaced cavity resonance modes.

DESCRIPTION OF THE DRAWING

Embodiments of the invention will now be described by way of example with reference to the accompanying diagrammatic drawings, of which.

DESCRIPTION OF THE PREFERRED EMBODIMENTS

Figure 1:
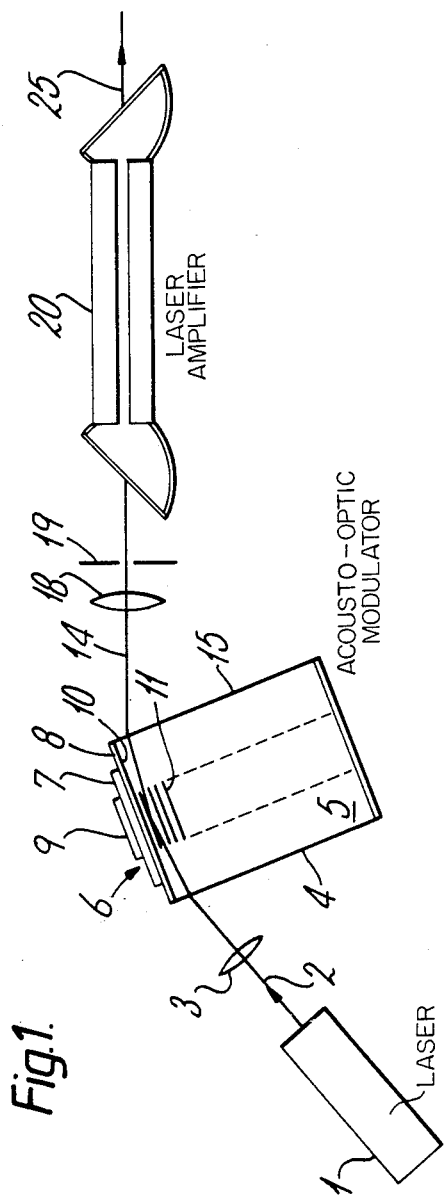
FIG. 1 illustrates one form of optical modulation arrangement in accordance with the invention.
Figure 2:
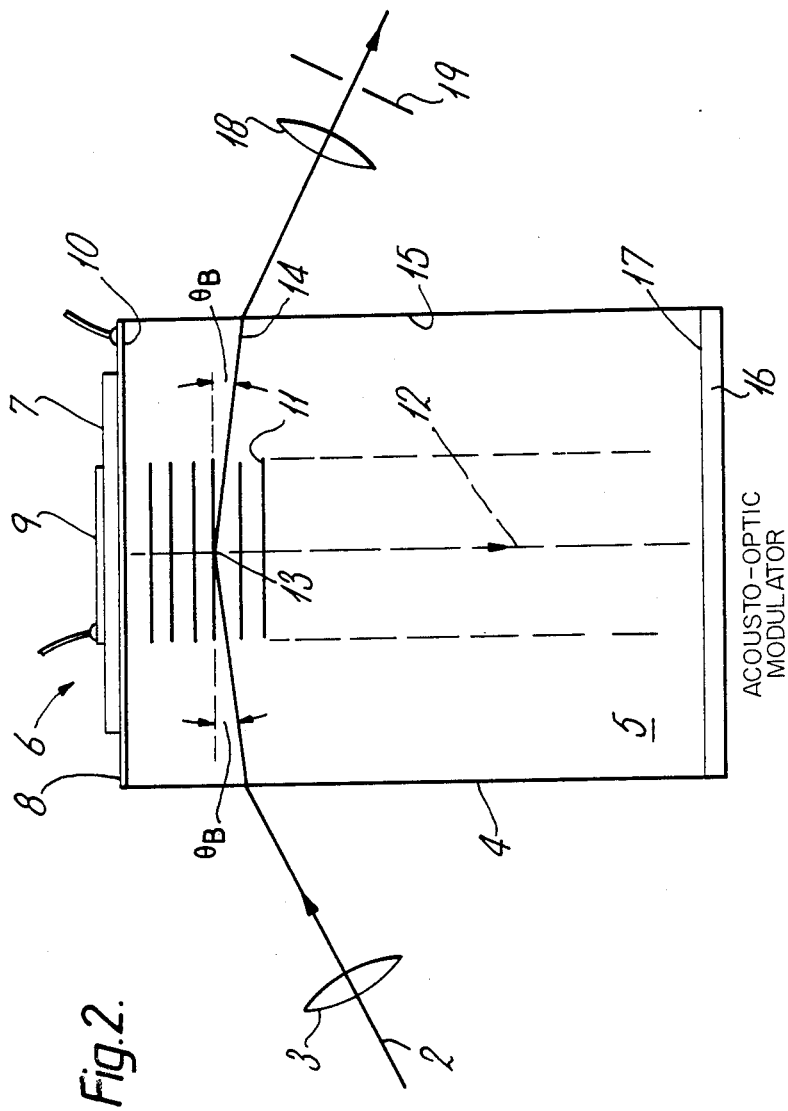
FIG. 2 illustrates the operation of an acousto-optic modulator forming part of FIG. 1.

Reference will now be made to FIG. 1 which illustrates one form of an optical modulation arrangement in accordance with the invention. In this embodiment, a $CO_2$ laser 1 directs a beam of optical radiation of wavelength 10.06 μm, via a focussing lens 3 made of germanium and a optical input surface 4 of a block 5 of germanium, into the interaction region 13 (FIG. 2) of an acousto-optic modulator. The modulator is formed by the combination of the block 5 and a planar electroacoustic transducer 6 attached to one end face 10 of the block 5.

The operation of such an acousto-optic modulator is discussed, for example, by E. I. Gordon in Proc. IEEE Vol. 54, October 1966, pages 1391-1401, and is illustrated herein in FIG. 2. The modulator block 5 is formed from a monocrystal of germanium. One end face 10 of block 5 provided with a conducting electrode 8. Electrode 8 comprises a conductive film made up of layers of chromium, gold and indium. Block 5 and electrode 8 form a substrate by means of which a wafer 7, which is 35 degree Y-cut from a monocrystal of lithium niobate, is pressure bonded to the end face 10, for example by the method described in U.K. Patent Application No. 8610225.

After bonding, the wafer 7 is lapped to the correct thickness for resonance at the acoustic frequency required for the transducer 6. A second electrode 9 is then applied to the outer surface of the wafer 7 to complete the transducer 6. Electrode 9 defines by means of its extent, the size of the active region of the transducer 6 and hence the cross sectional dimensions of a beam of longitudinal compression waves 11 which the transducer 6 will direct, when energised, into the block 5 along the acoustic propagation axis 12.

When the transducer 6 is energised at its resonant frequency, for example a frequency of from 60 to 100 MHz, a regular succession of parallel acoustic wavefronts 11 will propagate in the direction 12 in the block 5. The local stress variations in the medium of the block 5, which are associated with the longitudinal compression wavefronts, will result in corresponding local variation in refractive index and thus form a corresponding regular diffraction structure which will also propagate along the direction 12 with rthe velocity of the acoustic waves.

The input laser beam 2 is directed into the block 5 so that it is inclined at the Bragg angle $\theta_B$ to the acoustic wavefronts 11 so that Bragg diffraction takes place and a diffracted beam 14 is produced inclined at an angle $2\theta_B$ to the incident beam 2. Beam 14 has a magnitude dependent on the amplitude of the acoustic weaves 11. The Bragg angle is given by $$\theta_B = \sin^{-1}\left(\frac{\lambda}{2\Lambda}\right),$$

where λ is the optical wavelength of the input beam in the medium of the block 5 and Λ is the acoustic wavelength of the waves 11.

The germanium block 5 is cut so that the acoustic propagation direction 12 lies along the [100] germanium crystal axis in order to provide a good modulation sensitivity. A better modulation sensitivity can e achieved if the direction 12 lies along the [111] germanium axis but in this case the incident beam 2 must be polarised so that the plane of the electric vector is parallel to the propagation direction 12. Since the modulated beam is to be amplified the need to use the more efficient direction is not great.

The parallel beam from the laser 1, and which may have a cross section diameter of 2 mm, is focussed into a narrow part of the interaction region 13 of from 100 to 200 μm in diameter to provide as short a response time as possible for the modulator. The width of the acoustic beam in the plan view of FIG. 1 is in one example 6 mm, however, the corresponding dimension perpendicular to the plane of FIG. 1 is only 0.3 mm.

Furthermore, in respective examples in which the acoustic frequency was 60 MHz and 100 MHz, the acoustic wavelengths for corresponding [100] and [111] orientations were 78.7 μm and 55 μm respectively. Since in the case of germanium the refractive index n=4, the light from the $CO_2$ laser 1 whose free space wavelength $\lambda_o$=10.6 μm, will have a wavelength λ in the medium of 2.65 μm. This implies a Bragg angle $\theta_B$ of 0.96 degrees and 1.38 degrees in the respective cases. These angles are small and the corresponding angles depicted in the Figures have been exaggerated for the sake of clarity.

On leaving the exit optical side face 15 of the block, the modulated diffracted beam 14 is recollimated by a further germanium lens 18 and the collimated beam is passed through an aperture in a diaphragm 19 in order to ensure removal of the undiffracted beam.

To prevent the acoustic wave 11 from being reflected from the far end 17 of the block 5 so as to return and then, after re-reflection at the transducer face 10 of the block, providing an unwanted delayed modulation signal, a laer 16 (FIG. 2) of an acoustic absorber can be applied to the face 17.

The modulated diffracted beam 14, after passing through the aperture in the diaphragm 19, is directed at the input of a laser amplifier 20. Because the beam 14 is formed by diffraction from a moving refractive structure, the optical frequency of the beam will undergo a doppler change and because, in the present example, the optical beam is directed towards the front of an oncoming acoustic wavefront, the frequency of the diffracted modulated beam will be up-converted by the frequency of the acoustic wave.

Since the centre frequency of the $CO_2$ laser amplifier 20 will corresond to the natural lasing frequency of the source $CO_2$ laser 1, and the overall amplification bandwidth of a low-pressure (i.e. approximately 1 torr) $CO_2$ laser amplifier would only be about 70 MHz, the up-conversion of the optical frequency by from 60 to 100 MHz would take the optical frequency of the diffracted beam well outside the 35 MHz halfwidth of the amplifier response band if both the source 1 and the amplifier 20 were formed by low pressure $CO_2$ lasers.

Consequently, in accordance with the invention, at least one of the lasers is arranged to operate at an elevated gas pressure such as to provide an increased amplification bandwidth which is sufficient to span the change in the optical frequency imposed on the diffracted modulated output beam by the acousto-optic modulator.

Due to scaling considerations, see for example IEEE Journal of Quantum Electronics Vol. QE-9, No. 9 (September 1973), pages 940-946, it can be shown that, as the gas pressure in a laser is increased the inside diameter of the bore of the discharge tube should be decreased proportionally in order to maintain similar gas discharge and lasing conditions. Thus, at a gas pressure of about 200 torr which would be sufficient to increase the amplification bandwidth to about 1 GHz, the bore diameter would be reduced to about 1.5 to 2 mm, and the inside surface of the confining tube wall can then be employed to form an oversized optical waveguide which confines the optical energy within the discharge space. This reduces optical energy loss, sometimes even when the tube wall material is inherently lossy since a high dielectric constant (n) or a high conductivity (k) will tend to exclude the electromagnetic fields from the dielectric, effectively reflecting the optical energy back from the wall into the hollow guide. This form of high pressure laser is therefore called a waveguide laser. A suitably heat conductive wall material is berillium oxide although other materials such as, for example, $SiO_2$ or $Al_2O_3$ can alternatively be used.

Consequently, in accordance with the present form of device in accordance with the invention, the laser amplitifer 20 is a waveguide gas laser amplifier operating under elevated gas pressure conditions such that the increased amplification bandwidth (provided by operating at an increased gas pressure) includes the converted frequency and the modulation sidebands of the modulated diffracted output beam from the acousto-optic modulator.

Thus, in FIG. 1 the laser amplifier 20 is shown to be a waveguide $CO_2$ laser amplifier working, in the present example, at a gas pressure of 150 torr. At this pressure the $CO_2$ laser amplifier will have a lasing excitation linewidth of about 1 GHz which will include the converted optical frequency of the modulated beam and its sidebands enabling modulating frequencies of several MHz to be readily accomodated.

However, commercial forms of waveguide $CO_2$ lasers normally employ a single section of capillary discharge tube and have a maximum lasing power capability in the region of about 40 watts. If such a device were opeated as an amplifier laser the maximum output power capability would be much less, in the region of 5 watts. This will be insufficient for many purposes.

The output power can be increased by employing a waveguide $CO_2$ laser amplifier formed by a tandem arrangement of several capillary discharge sections as described by Marvin B. Klein and Richard L. Abrams in IEEE Journal of Quantum Electronics QE 11, No. 8 (August 1975), pages 609-615, but this will increase the cost since the individual capillary discharge sections have to be carefully aligned with one another, mounted on a rigid base and suitably supplied with a continuous flow of lasing gas. Alternatively a plurality of single section waveguide lasers may be arranged one after the other along the beam path.

Figure 3:
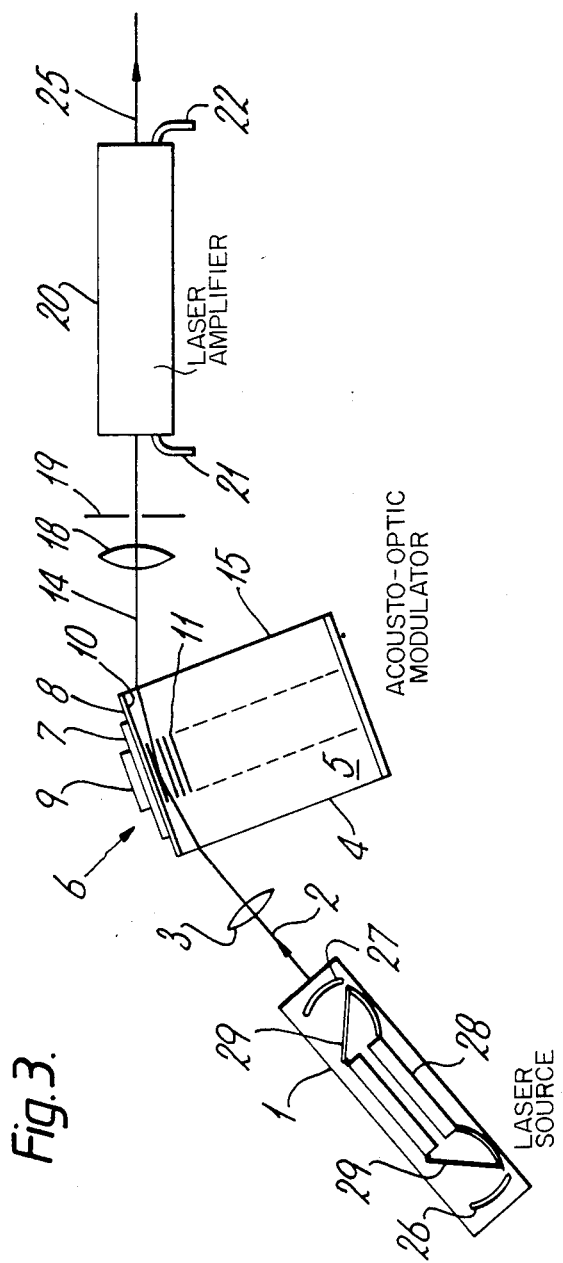
FIG. 3 illustrates another form of optical modulation arrangement in accordance with the invention.

For this reason, in a preferred form of an optical modulation arrangement embodying the invention and illustrated in FIG. 3, the laser sorce 1 is arranged to operate at an elevated gas pressure and is located in an optical cavity by means of which it is tuned so that the optical frequency of the generated beam is offset from the amplification frequency range of the laser amplifier 20 by at least part of the change in the optical frequency imposed on the diffracted modulated output beam by the acousto-optic modulator.

Thus, the laser source 1 comprise a waveguide $CO_2$ laser operating at a pressure of approximately 150 torr in the present example, located within a tunable optical cavity formed respectively by a highly reflecting mirror 26 and a partly transmitting mirror 27, one of which is adjustable for tuning purposes. For example, the mirror 26 can be mounted on a piezoelectric element which is arranged to provide an axial displacement responsive to a control voltage applied to the element. The ends of the waveguide $CO_2$ laser 28 are closed by Brewster windows 29, typically of cadmium telluride to minimise reflective losses.

The laser amplifier 20 is a conventional low pressure $CO_2$ amplifier laser operating at a gas pressure of about 1 torr, and because it is required to operate at a high power output of 100 watts or above, it is preferable for a continuous flow of $CO_2$ to be supplied to the laser amplifier 20 via a supply line 21 and exhausted via a connection 22. Low pressure $CO_2$ amplifier lasers are available commercially with a capability of amplification to 100 watts which is a satisfactory power level for the laser machining of printing blocks.

Figure 4:
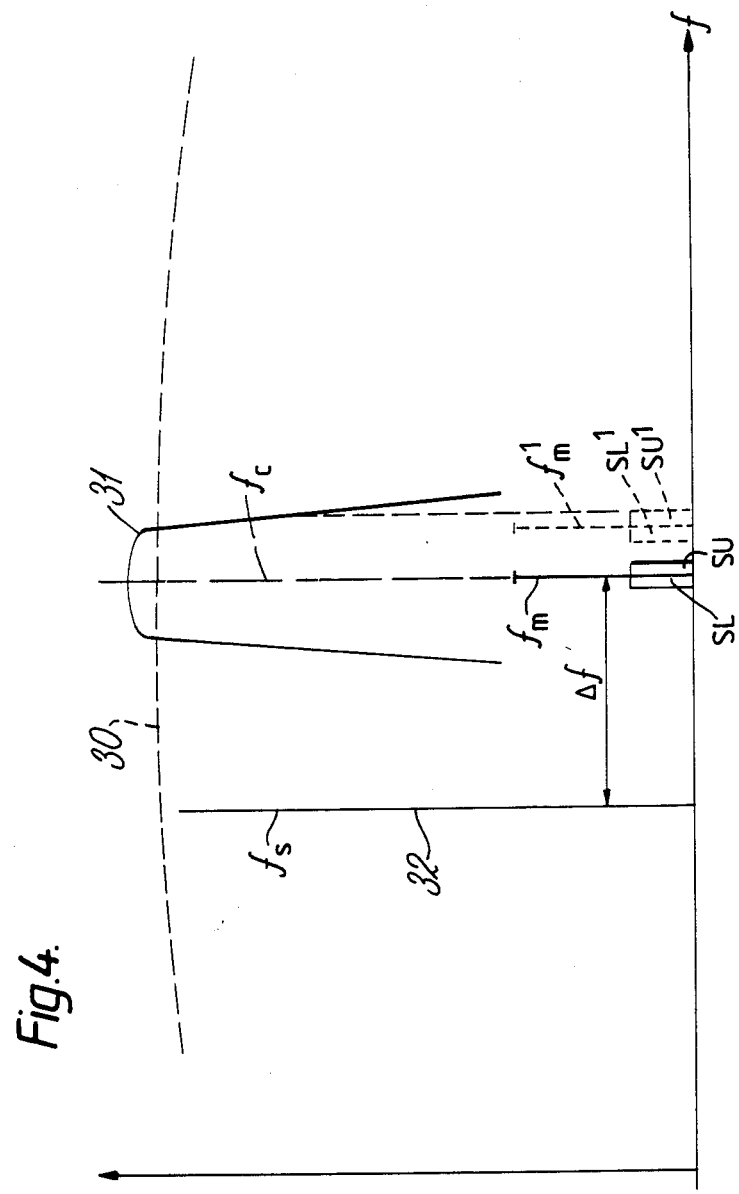
FIG. 4 is a reponse diagram illustrating the operation of the arrangement of FIG. 3.

The optical cavity in which the source waveguide laser 1 is located, is tuned so that the laser generates a frequency $f_s$ which is offset from the central frequency $f_c$ of the low pressure $CO_2$ laser amplifier 20 by a difference in frequency $\Delta f$ which is either equal to the acoustic frequency or is sufficiently close to the acoustic frequency to enable the modulated diffracted signal and its sidebands to be effectively accommodated within the amplification passband of the amplifier laser 20. This is illustrated in the diagram of FIG. 4 which shows a response curve 30 relating the laser amplification to frequency for the waveguide source laser 1 operating at an elevated gas pressure for which the bandwidth is about 1 GHz, and a corresponding response curve 31 for the low pressure amplifier laser 20 whose bandwidth is about 70 MHz. Both curves are centred about the natural P2O lasing transition frequency $f_c$ at a wavelength of 10.6 μm normally employed by the $CO_2$ gas laser.

The response 30 of the waveguide source laser 1 is shown dashed because the frequency of the optical output generated by the tunable source 1 depends on the tuning adjustment of the optical cavity in which the waveguide $CO_2$ laser is located, and this is indicated by the continuous line peak 32. The optical cavity is tuned by adjusting the separation of the mirrors 26 and 27 so that the peak 32 representing the optical frequency $f_s$ generated by the source 1 is separated from the centre frequency $f_c$ of the amplifier laser 20 by a difference frequency $\Delta f$.

In one example $\Delta f$ is made equal to the frequency of the acoustic wave emitted by the transducer 6 with the result that the up-converted diffracted modulated beam frequency $f_m$ will be the same as $f_c$ and the modulation signal will give rise to sidebands represented by the blocks SL and SU. However, provided that the overall width of the sidebands SL+SU is somewhat less than the width of the amplification passband 31 of the amplifier 20, the diffracted modulated beam frequency $f_m^1$ may lie anywhere within the passband 31 provided that both the sidebands $SL^1$ and $SU^1$ are also accommodated therewithin. This means that the difference frequency $\Delta f$ can be slightly greater or less than the acoustic frequency. This is advantageous because it is not always possible to make a tunable waveguide laser operate satisfactorily, i.e. consistently and in a stable manner, at an arbitrary frequency by tuning the resonant optical cavity because the laser will sometimes tend to pull into oscillation at a different cavity mode from the one expected and desired.

The tuning of the waveguide source laser 28 can be controlled and stabilised by diverting part of the output beam 2, for example via a lightly silvered mirror (not shown) located in the beam path and inclined to the direction of the beam, onto an optical frequency discriminating arrangement to provide a control signal output for the piezoelectric element which axially displaces one of the resonator mirrors, for example the mirror 26. The principles of some forms of frequency stabilising arrangements are referred to in a paper by P. W. Smith in Proc IEEE, vol. 60, (April 1972), pages 422–440.

One suitable conventional form of frequency discriminator comprises an optical interference filter having a narrow pass-band or stop-band centred on the desired source frequency $f_s$, followed in the optical path by a photodetector. An oscillatory sweep signal is applied to the piezoelectric mirror-displacement element to sweep the laser output frequency across the pass- or stop-band of the filter, and the detector output is applied to a phase sensitive detector whose reference is formed by the sweep signal, to form a control signal for the piezoelectric element, whose polarity and magnitude depends on the sense and amount of the displacement of the mean optical frequency of the sweep from the mid point of the pass- or stop-band of the filter. The disadvantage of this method is that the stabilised laser frequency has superposed thereon a frequency dither resulting from the sweep signal, which depends on the selectivity of the filter but can be greater than 35 5 MHz.

An alternative frequency descriminating and control arrangement thatcan be employed, is to apply both the output of the waveguide laser 28 and the output from a stable low pressure $CO_2$ reference laser (not shown) tuned to the P(20) 10.6 μm $CO_2$ laser transition, to the optical input of a high speed photodiode (not shown), for example a HgCdTe photodiode. The electrical output from the photodiode will include a signal whose frequency is the beat frequency occurring between the optical outputs of the waveguide laser 28 and the reference laser, and this is fed to a frequency discriminator circuit tuned to the frequency of the acoustic wave. The discriminator output is then used to control the piezoelectric element for tuning the waveguide laser cavity.

In a further arrangement the output frequency of the waveguide laser 28 is stabilised to a voltage programmable absorption line in deuterated ammonia ($NH_2D$) in a stark cell in the manner described by T. A. Nussmeier and R. L. Adams in Applied Physics Letters Vol. 25, No. 10, (15th Nov. 1974), pages 615–617. This aranement has the advantage over the first mentioned arrangement in that the frequency dither used to scan the absorption band relative to the laser output frequency, can be applied to the electrodes of the Stark cell containing the $NH_2D$ gas, instead of to the piezoelectric tuning element which varies the laser output frequency.

It will be apparent from the above description relating to FIG. 4 that it is also possible, while employing a high pressure (i.e. about 150 torr) tunable waveguide $CO_2$ laser as the source 1, to employ a $CO_2$ laser amplifier 20 using a slightly elevated gas pressure so as to broaden the response bandwidth to a small extent while at the same time making it possible to provide a reasonably high power output. In this case the frequency offset of the source laser 1 from the natural lasing frequency $f_c$ can be reduced, the remaining part of the frequency change due to up-conversion being accommodated within the wider amplifier bandwidth.

It should be noted herein that the invention is equally applicable to the case in which the laser beam 2 from the source 1 is directed onto the acoustic refraction wavefronts 11 from the behind, namely in the same direction as the acoustic wave propagation direction. In this case the doppler effect of the moving diffraction structure will be to cause the diffracted modulated optical beam 15 to be down-converted in frequency by an amount equal to the acoustic frequency. In the preferred second embodiment herein describd the source 1 would have to be similarly tuned to a corresponding frequency lying above the centre frequency $f_c$ of the passband of the laser amplifier 20.

The amplified modulated output beam 25 which emerges from the amplifier 20 can be passed to beam deflection and scanning means if desired, for example in order to cut a printing plate. In addition to the above use a modulation arrangement in accordance with the invention can be employed wherever a high power laser beam modulated at frequencies up to and beyond 1 MHz is required with a good extinction ratio.

What is claimed is:

1. An optical modulation arrangement for modulating a beam of optical radiation generated by a laser source, including an optical modulator for modulating the amplitude of the beam by means of an electrical signal, followed by a laser amplifier for amplifying the modulated beam, characterised in that the optical modulator is an acousto-optic modulator employing Bragg diffraction from an acoustic wave propagating in an acoustic medium transparent to the optical radiation, said laser source and said laser amplifier are both gas lasers employing the same kind of lasing gas and at least one of said lasers operates at an elevated gas pressure such as to provide an amplification bandwidth with an increased frequency range which is sufficient to span the change in the optical frequency imposed on the diffracted modulated output beam by the acousto-optic modulator.

2. An optical modulation arrangement as claimed in claim 1, characterised in that the laser source is a $CO_2$ gas laser and the lasing gas of the laser amplifier is $CO_2$.

3. An optical modulation arrangement as claimed in claim 1 or claim 2, characterised in that the laser amplifier comprises at least one gas laser operated at a said elevated gas pressure such that the useful amplification bandwidth includes the converted optical frequency and its modulation sidebands.

4. An optical modulation arrangement as claimed in claim 3, characterised in that the or each amplifier laser is a waveguide laser.

5. An optical modulation arrangement as claimed in claim 3, characterised in that the or each amplifier laser is a waveguide $CO_2$ laser operating with a gas pressure of at least 100 torr.

6. An optical modulation arrangement as claimed in claim 1 or claim 2, characterised in that the source laser is arranged to operate at an elevated gas pressure and is tuned by means of an optical cavity so that the optical frequency of the generated beam is offset from the amplification frequency range of the laser amplifier by at least part of the change in the optical frequency imposed on the diffracted modulated output beam by the acousto-optic modulator.

7. An optical modulator arrangement as claimed in claim 6, characterised in that the laser source is formed by a tunable $CO_2$ waveguide laser operating with a gas pressure greater than 100 torr.

8. An optical modulator arrangement comprising:
a laser source comprising a gas laser containing a first lasing gas at a first gas pressure, said laser source having a first amplification bandwidth, said laser source generating a beam of optical radiation, said beam having substantially a first frequency falling within the first amplification bandwidth, said beam having an amplitude;
an optical modulator for receiving the beam of optical radiation from the laser source and for receiving an electrical modulation signal, said optical modulator modulating the amplitude of the beam of optical radiation from the laser source in response to the electrical modulatin signal to produce a modulated beam of optical radiation, said modulated beam of optical radiation having substantially a second frequency, said modulator comprising an acoustooptic modulator, said acoustooptic modulator diffracting the beam of optical radiation in an acoustic medium which is transparent to the optical radiation and in which an acoustic wave is propagating, said acoustic wave having substantially an acoustic frequency; and
a laser amplifier for receiving the modulated beam of optical radiation from the optical modulator and for amplifying the modulated beam of optical radiation, said laser amplifier comprising a gas laser containing a second lasing gas at a second gas pressure, said second lasing gas being the same as the first lasing gas, said laser amplifier having a second amplification bandwidth;
wherein at least one gas laser operates with an elevated gas pressure so as to increase its amplification bandwidth so that the frequency of the modulated beam of optical radiation falls within the amplification bandwidth of the laser amplifier.

9. An optical modulator arrangement as claimed in claim 8, characterized in that:
the electrical modulation signal has a frequency;
the modulated beam of optical radiation comprises a band of frequencies substantially centered on a frequency equal to the first frequency plus the acoustic frequency;
the band of frequencies has a width substantially equal to twice the frequency of the electrical modulation signal; and
substantially the entire band of frequencies of the modulated beam of optical radiation falls within the amplification bandwidth of the laser amplifier.

10. An optical modulator arrangement as claimed in claim 8, characterized in that:
the electrical modulation signal has a frequency;
the modulated beam of optical radiation comprises a band of frequencies substantially centered on a frequency equal to the first frequency minus the acoustic frequency;
the band of frequencies has a width substantially equal to twice the frequency of the electrical modulation signal; and
substantially the entire band of frequencies of the modulated beam of optical radiation falls within the amplification bandwidth of the laser amplifier.

11. Apparatus for manufacturing printing plates comprising:
a laser source comprising a gas laser containing a first lasing gas at a first gas pressure, said laser source having a first amplification bandwidth, said laser source generating a beam of optical radiation, said beam having substantially a first frequency falling within the first amplification bandwidth, said beam having an amplitude;
an optical modulator for receiving the beam of optical radiation from the laser source and for receiving an electrical modulation signal, said optical modulator modulating the amplitude of the beam of optical radiation from the laser source in response to the electrical modulation signal to produce a modulated beam of optical radiation, said modulated beam of optical radiation having substantially a second frequency, said modulator comprising an acoustooptic modulator, said acoustooptic modulator diffracting the beam of optical radiation in an acoustic medium which is transparent to the optical radiation and in which an acoustic wave is propagating, said acoustic wave having substantially an acoustic frequency; and a laser amplifier for receiving the modulated beam of optical radiation from the optical modulator and for amplifying the modulated beam of optical radiation, said laser amplifier comprising a gas laser containing a second lasing gas at a second gas pressure, said second lasing gas being the same as the first lasing gas, said laser amplifier having a second amplification bandwidth;

wherein at least one gas laser operates with an elevated gas pressure so as to increase its amplification bandwidth so that the frequency of the modulated beam of optical radiation falls within the amplification bandwidth of the laser amplifier; and means for scanning said amplified beam over the surface of a printing plate.

12. Apparatus for manufacturing printing plates as claimed in claim 11, characterized in that:

the electrical modulation signal has a frequency;

the modulated beam of optical radiation comprises a band of frequencies substantially centered on a frequency equal to the first frequency plus the acoustic frequency;

the band of frequencies has a width substantially equal to twice the frequency of the electrical modulation signal; and substantially the entire band of frequencies of the modulated beam of optical radiation falls within the amplification bandwidth of the laser amplifier.

* * * * *